United States Patent [19]

Hansen et al.

[11] Patent Number: 5,753,861
[45] Date of Patent: May 19, 1998

[54] COVERING DEVICE

[75] Inventors: Clemens Hansen, Pinneberg-Thesdorf; Herbert Dust, Buholz; Gerhard Lohmeier, Hamburg, all of Germany

[73] Assignee: Minnesota Mining and Manufacturing, Saint Paul, Minn.

[21] Appl. No.: 719,933

[22] Filed: Sep. 25, 1996

[30] Foreign Application Priority Data

Feb. 10, 1995 [EP] European Pat. Off. .............. 95202637
Sep. 23, 1996 [EP] European Pat. Off. .............. 96870122

[51] Int. Cl.⁶ ........................................................ H01B 7/24
[52] U.S. Cl. ..................... 174/93; 174/136; 174/DIG. 8
[58] Field of Search ..................... 174/73.1, 84 R, 174/93, DIG. 8, 136, 74 A, 91; 428/121, 122, 128

[56] References Cited

U.S. PATENT DOCUMENTS

| | | | |
|---|---|---|---|
| 3,515,798 | 6/1970 | Sievert | 174/135 |
| 3,824,331 | 7/1974 | Mixon, Jr. et al. | 174/135 |
| 4,029,895 | 6/1977 | Scarborough | 174/138 |
| 4,391,661 | 7/1983 | Izraeli | 156/49 |
| 4,503,105 | 3/1985 | Tomioka | 428/36 |
| 4,506,430 | 3/1985 | Guzay, Jr. | 29/450 |
| 4,685,189 | 8/1987 | Palmqvist et al. | 29/450 |
| 5,087,492 | 2/1992 | Vallauri et al. | 174/73.1 |
| 5,098,752 | 3/1992 | Chang et al. | 428/34.9 |
| 5,171,940 | 12/1992 | Vallauri | 174/73.1 |
| 5,204,933 | 4/1993 | Marx | 385/53 |

FOREIGN PATENT DOCUMENTS

| | | | |
|---|---|---|---|
| 0 393 495 A1 | 4/1990 | European Pat. Off. | H02G 15/18 |
| 0 490 133 A2 | 11/1991 | European Pat. Off. | H02G 15/013 |
| 0 518 560 A1 | 12/1992 | European Pat. Off. | H01R 4/70 |
| 0 619 636 A1 | 4/1994 | European Pat. Off. | |
| 2922836 | 12/1980 | Germany | H02G 15/18 |
| 2938134 A1 | 4/1981 | Germany | H02G 15/18 |
| 3541740 A1 | 5/1987 | Germany | H02G 15/18 |
| 64-23711 | 1/1989 | Japan | H02G 15/18 |
| 2 140 985 | 5/1984 | United Kingdom | H02G 15/115 |
| 8300779 | 3/1983 | WIPO | 174/DIG. 8 X |
| WO 91/16564 | 10/1991 | WIPO | F16L 11/00 |

Primary Examiner—Kristine L. Kincaid
Assistant Examiner—Dhiru R. Patel
Attorney, Agent, or Firm—Matthew B. McNutt

[57] ABSTRACT

A covering device for applying an elastic cover to an elongate object includes a folded elastic sleeve having an inner sleeve portion and at least one coaxially disposed outer sleeve portion overlaying the inner sleeve portion. The inner and outer sleeve portions are continuously joined at least at one circumferential edge. The folded elastic sleeve is positioned on a support for holding the folded elastic sleeve in a radially stretched condition. The support has a first end arranged adjacent to the continuous joint of the outer and inner sleeve portions. Relative movement between the outer sleeve portion and the inner sleeve portion results in the outer portion moving and recovering onto the elongate object. The support includes stress relief means associated with the first end for reducing the stress in the outer sleeve portion adjacent the first end of the support when the outer sleeve portion has been moved onto the object to be covered.

8 Claims, 17 Drawing Sheets

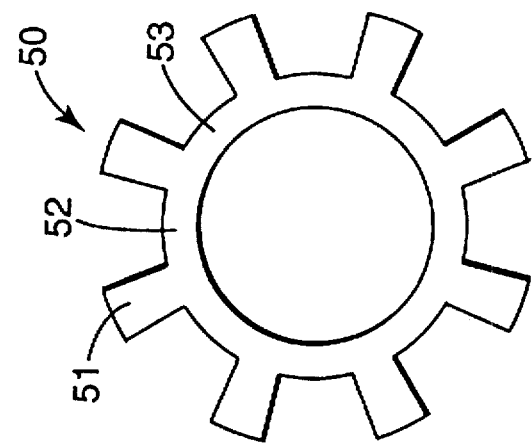
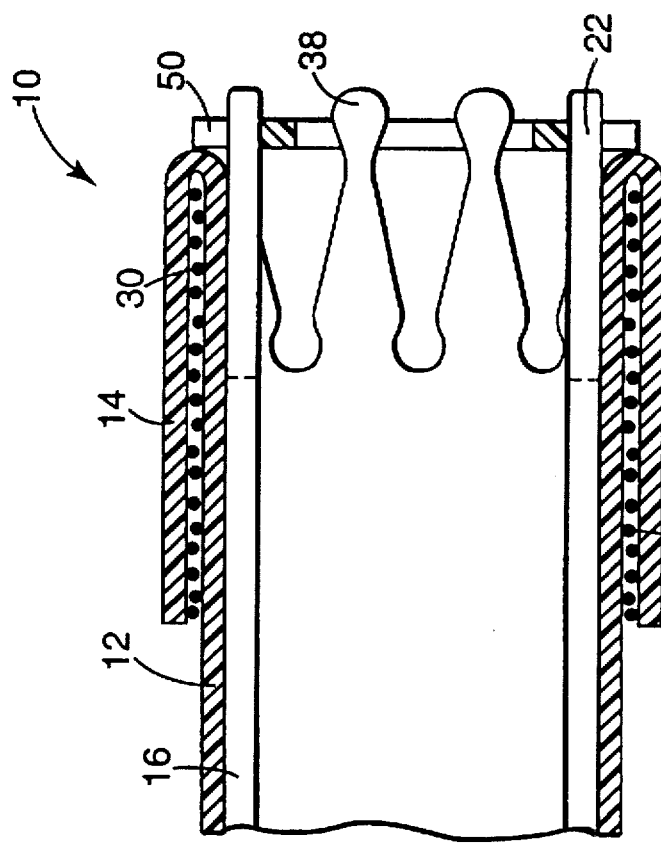
Fig. 13A
Fig. 13B

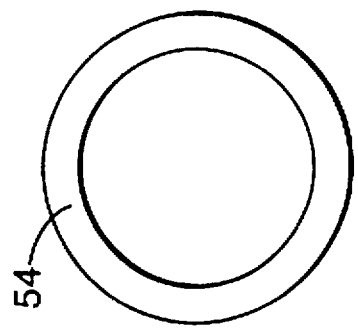
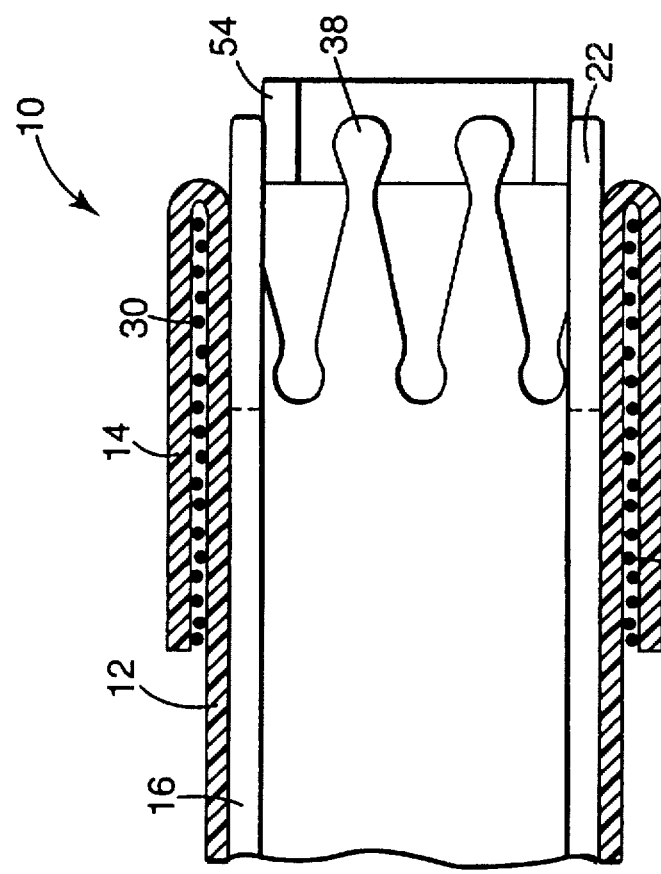

COVERING DEVICE

The present invention relates to a covering device for covering an elongate object. In particular, the covering device in accordance with the present invention may be used for mechanically protecting, insulating and sealing or maintaining electrical continuity of electric, power or telecommunications cables.

BACKGROUND OF THE INVENTION

U.S. Pat. No. 3,824,331 describes a device for permitting a radially expanded resilient tubular cover to be recovered onto an elongate substrate. The expanded resilient tubular cover is rolled up into two portions and held in this condition on a hollow support. On releasing the holding means, the resilient tubular cover is rolled off onto the substrate and the support is removed. The large diameter of the rolled resilient tubular member in the expanded condition puts a high stress on the outermost portion of the resilient tubular cover. Hence, the usable internal diameter of the hollow support has to be reduced to avoid permanent set of the resilient tubular cover. DE-A-2745888 describes a similar device except that the support is not removed but remains inside the resilient tubular cover after recovery.

U.S. Pat. No. 4,506,430 describes an applicator for a radially expanded sleeve. A hollow sleeve support holds a folded elastic sleeve in the expanded condition. A lubricating substance is applied between the outer and inner portions of the folded sleeve. After the applicator is coaxially disposed with respect to an elongate object, a longitudinally directed force applied to the outer sleeve portion results in relative movement between the outer sleeve portion and the inner sleeve portion, thus removing the folded elastic sleeve from the support and applying it to the elongate object. U.S. Pat. No. 5,098,752 describes a method for covering a substrate which includes holding an elastic sleeve in a radially expanded condition on a ribbed support and then sliding the elastic sleeve off the support onto the underlying substrate. The valleys between the ribs are filled with lubricant. The ends of the elastic sleeve on the support may be folded back. After removal of the support, the folded ends may then be slid over the underlying portions of the elastic sleeve.

U.S. Pat. No. 4,685,189 describes a sleeve of pliable, elastic material such as silicone rubber, intended to be turned inside out when being fitted onto a slender elongated core. The inside surface of the sleeve has densely located hollows which are filled with lubricant.

DE-A-2938134 describes a cable joint including a joint case and corrosion protection including conical caps. In one embodiment the conical cap is integral with the corrosion protection of the main joint case and is made of plastic. The cap is folded back onto the larger joint case until installation of the earthing system is complete. The construction requires the fabrication of a specially shaped corrosion protection with specially shaped ends.

EP-0619636 describes a support for a radially expanded elastic sleeve which includes a central support core in three sections. On either side of a middle section, two outer sections are placed which are provided with a helical deformable material between the support and the outer elastic sleeve. The helical material allows removal of the two outer sections of the support thus allowing the ends of the elastic sleeve to recover.

U.S. Pat. No. 3,515,798 and U.S. Pat. No. 4,503,105 describe hollow tubular cores for supporting a radially expanded tubular elastic member. The core may be stripped from inside the elastic member by unwinding a helix. EP-A-0,490,133 and DE-A-3,541,740 describe the use of a tubular body suitable for mechanical protection over which a heat-shrinkable tube is mounted. The heat-shrinkable tube overlaps the ends of the tubular body. The body is located over an elongate substrate and the ends shrunk down in the known manner. The complete device is not compact due to the overlap of the ends of the tubular body by the heat shrinkable tube.

Heat shrink devices are considered by some to have the disadvantage of requiring a naked flame or at least a heat source at the installation site.

In the known "cold-shrink" devices which require removal of a core or support, the removal and disposal of the core or support is considered by some to be a disadvantage. If the core or support is not removed and if a compact device is to be made, the part of the elastic sleeve which is to project beyond the support or core must be accommodated on the support in some way. Rolling of the elastic sleeve results in high stresses in the material. Folding of the elastic sleeve back on itself has been restricted to systems of direct application, systems in which the core is removed or a system in which a plastic corrosion protection material is used with specially shaped conical ends.

A typical application of the covering device in accordance with the invention is the protection of telecommunication splices having a relatively small (typically 2 to 50) number of wire pairs. Sealing against water is important and this is conventionally achieved by applying prefabricated mats of gel material to the cable joints. The method is time consuming and labour intensive. Further, additional mechanical protection must be provided to protect the insulated joints.

A further typical application is for splicing low-voltage cables. Conventionally such splices may be made by filling a hollow body with an electrical resin, typically of urethane or epoxy basis. Such resins have a limited shelf life and involve some mixing on site.

Such cable splices may form a cable line with sections of cable therebetween. Such a cable line may be buried, suspended in the air or fixed to walls or a side of a building.

There is a need for a simple, inexpensive, reliable, compact covering device which does not require the application of heat, and in particular, does not require the use of a naked flame, which does not involve mixing and handling resin components on site and does not require the removal and disposal of a support core.

SUMMARY OF THE INVENTION

The invention provides a covering device for applying an elastic cover to an elongate object, comprising:

a folded elastic sleeve having an inner sleeve portion and at least one coaxially disposed outer sleeve portion overlaying said inner sleeve portion, said inner and outer sleeve portions being continuously joined at least at one circumferential edge, said elastic sleeve having a substantially constant diameter in its non-folded, recovered condition;

a support for holding said folded elastic sleeve in a radially stretched condition, said support having a first end arranged adjacent to the continuous join of said outer and inner sleeve portions, relative movement between said outer sleeve portion and said inner sleeve portion resulting in said outer portion moving and recovering onto the elongate object; and said support further including stress relief means associated with said first end for reducing the stress in said outer sleeve portion in the part thereof adjacent said first end of said support when said outer sleeve portion has been moved onto the object to be covered.

It is particularly preferred if the stress relief means are tapered in such a way as they reduce in diameter the further away from the center of the support. The taper may be pre-formed or generated by the installation technique.

The device in accordance with the invention may provide a covering for an elongate object which has one or more of the following properties: mechanical strength, durability, sealability against water ingress, ease of installation, low manufacturing cost, compactness.

The device in accordance with the invention may further provide the advantage that the elastic sleeve may be used at high expansion ratios without risk of splitting or tearing and thus allows the use of one product for a wider range of substrate diameters.

The dependent claims define further embodiments of the invention.

The invention, its embodiments and further advantages will be described in the following with reference to the following drawings.

BRIEF DESCRIPTION OF THE DRAWINGS

FIGS. 13A, 13B, 14A, 14B show schematic representations of an eighth embodiment of the present invention.

DESCRIPTION OF THE ILLUSTRATIVE EMBODIMENTS

Figure 1:
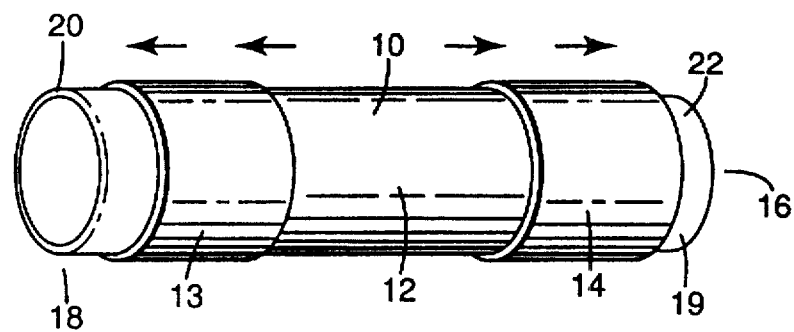
FIG. 1 shows schematically a first embodiment of the covering device in accordance with the present invention.

The drawings are not to scale and certain dimensions and thicknesses in the drawings have been exaggerated for purposes of clarity.

All the embodiments of the invention relate to the use of an elastic sleeve which is of a substantially constant diameter when it is recovered, stress-free state. The elastic sleeve may be made from an elastic tube which may be expanded to a larger diameter and subsequently shrink back to substantially its original dimensions when the expanding force is removed.

Some suitable materials for the elastic sleeve are described in U.S. Pat. No. 3,515,798 which is incorporated herein by reference. No restriction is anticipated on the chemical nature of the sleeve except that it must possess elasticity which allows it to be stretched and then to shrink to substantially its original dimensions. Rubbery elastomers such as natural rubber, natural and synthetic polyisoprenes, cis-polybutadiene and styrene butadiene rubber, butadiene-acrylonitrile rubber, polychloroprene (neoprene), butyl rubber, polysulphide rubber, silicone rubber, urethane rubber, polyacrylate rubber, epichlorhydrin homo- and copolymer rubbers, propylene oxide rubber, fluorosilicone rubber, fluorocarbon rubber, chlorosulphonated polyethylene rubber, chlorinated polyethylene rubber, ethylene-propylene rubber, ethylene-propylene-diene monomer terpolymer rubber (EPDM), nitroso rubber or phosphonitrilic rubber may be suitable. Preferred materials are ethylene-propylene-diene monomer terpolymers (EPDM) and silicone rubbers. Any of the above materials may be formulated to a variety of compositions by including flame retardants, conductive materials, materials to improve weathering properties, materials to produce electrical stress grading properties, glass or carbon fibers, inert fillers, etc. In particular the elastic sleeve may be insulating, conductive or electrically stress grading as required for high voltage applications.

The elastic sleeve is preferably made from a material with a low permanent set. A permanent set of less than 30% is preferred. The material of the elastic sleeve is preferably stable and durable. It is preferred if the elastomeric material making up the sleeve is cross-linked. The elastic sleeve may be extruded or moulded or fabricated from woven or knitted elastic fibers. The elastic sleeves according to the invention may also be made from laminating or co-extruding differing materials in order to obtain the required blend of properties.

The elastic sleeve may be of circular cross-section but is not limited thereto. The elastic sleeve may be, for instance, oval in cross-section. The elastic sleeves in accordance with the invention are typically medium walled tubes. Typical unstretched inner sleeve diameters lie in the range 5 to 80 mm, preferably 5 to 50 mm, and unstretched tube thicknesses in the range 1 to 5 mm, preferably 1 to 3 mm whereby the thicker tubes are generally used for the larger diameters.

In all the embodiments of the invention the elastic sleeve is supported on a support in a radially stretched condition. It is preferred if the expansion ratio of the elastic sleeve on the support compared with its recovered diameter is as high as possible without risking splitting of the sleeve or excessive permanent set. It is preferred if the expansion ratio is at least 3 to 1. This is achievable with the preferred materials EPDM and silicone rubber. Where reference is made in this application to highly expanded or highly stretched with reference to the elastic sleeve, it is understood that the expansion ratio is 3 to 1 or greater.

The support may be made from any suitable material which can withstand the compressive forces generated by the highly expanded elastic sleeve without deformation, fracturing or collapsing. Depending upon the application the support may be insulating or conductive. Suitable materials for the support may be plastics such as polyvinylchloride (PVC), polyethylene or polpropylene, thermosetting plastics such as epoxies, metals such as aluminium, steel or copper, ceramics or similar. The support may be hollow having one or more open ends, or may be solid as required by the application. The support may be generally circular or tubular or oval or polygonal e.g. hexagonal in shape. The support may include electronic circuitry or be suitable for attaching to other equipment. Typical support diameters lie in the range 10 to 240 mm, preferably 12 to 150 mm.

As shown in FIG. 1, a covering device 10 according to a first embodiment of the invention includes an elastic sleeve 12 as described above is supported on a support 16 in a highly stretched radially expanded state. Outer portions 13, 14 of the elastic sleeve 12 are folded back onto the sleeve 12. The support 16 extends through the sleeve 12. Optionally, the support 16 may also extend beyond the folded elastic sleeve 12 including end portions 18 and 19. Included at the ends of the central covered portion of support 16 and optionally in the end portions 18 and 19, are stress relieving means 20 and 22, respectively. As shown the support 16 is hollow. The invention is not limited thereto. The support may be solid and may be used as part of an end seal for a cable.

Figure 2A:
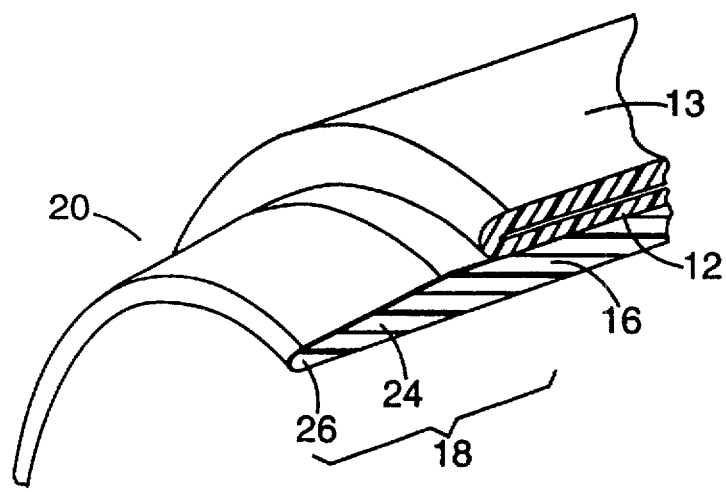
FIGS. 2A and 2B show schematic cross-sections through stress relieving means in accordance with a first embodiment of the invention.
Figure 2B:
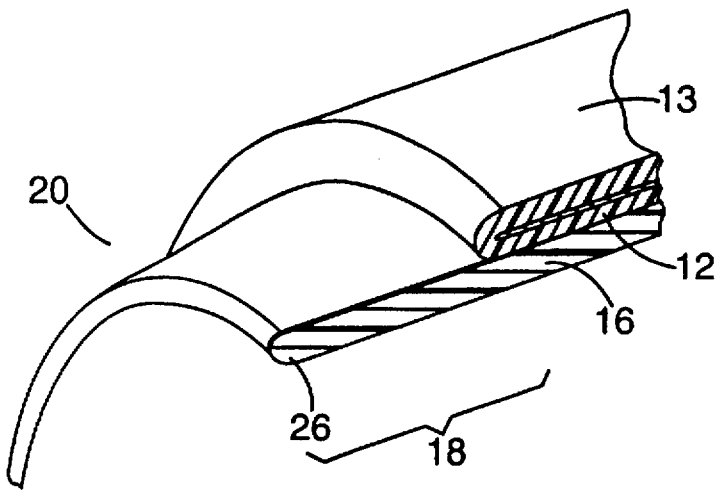

As shown in the cross-section of FIG. 2A, the stress relieving means 20 (or 22) may be provided by a tapered region 24. Further, a rounded region 26 may be provided. The taper may be between 1 and 10 degrees to the longitudinal axis of the support with the diameter of the support reducing towards its end. The radius of the region 26 is preferably equal to or larger than 0.1 times the thickness of elastic tubing 12 in the expanded state. It is particularly preferred if the radius is of the order of the thickness of the wall of the support at the position of the rounded region 26. The tapered region 24 may be omitted and only the rounded region 26 may be provided as shown in FIG. 2B, however, it is particularly preferred if, at least in the installed condition, stress relieving portions 20, 22 include tapered regions which reduce in diameter away from the center of support core 16.

Figure 3:
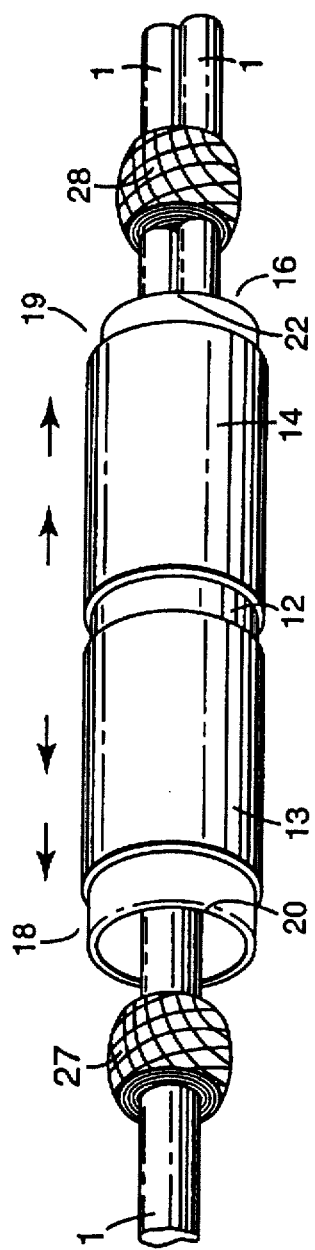
FIG. 3 shows the covering device in accordance with FIG. 1 ready for application to a cable bifurcating joint.

As shown in FIG. 3, the covering device 10 is slid over an elongate object 1 to be covered, which may be a cable or cable joint, and sealing materials 27, 28 may be applied to the elongate object 1 at positions adjacent the ends 18 and 19 of support 16 if a seal to the elongate object 1 is desired. In FIG. 3 a bifurcating cable joint is hidden by the covering device 10. A sealing mastic is preferred for the sealing material 27, 28 which seals under the pressure provided by the recovery of the elastic sleeve 12. The sealant 27, 28 should be compatible with the materials of object 1 and also the elastic sleeve 12. It should be non-toxic and retain its sealing properties over the expected life of the covered object 1 which may be 40 years. The sealant 27, 28 should preferably not have a tendency to creep or run at temperatures from −40° to 70° C. As shown in FIG. 3 the object 1 may be a single elongate object or two or more objects 1 lying substantially parallel to each other. In the latter case, the sealant 28 may wrapped around both objects 1 and placed between them. Where elastic sleeve 12 and support 16 are conductive, sealant 27, 28 may also be conductive. Conductive sleeve 12, support 16, and sealant 27, 28 may be used to maintain conductivity across a joint by electrically connecting screens or other conductive parts of cables.

Figure 4A:
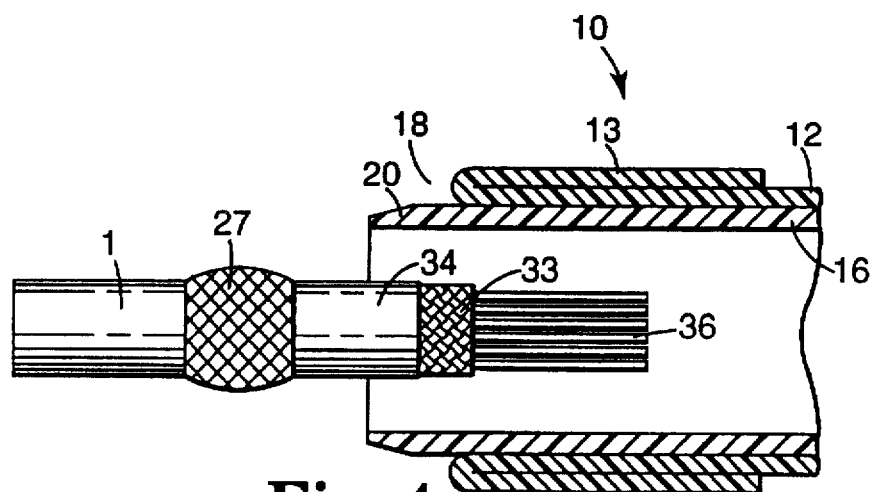
FIGS. 4A to 4E show steps in the installation of the covering device in accordance with FIGS. 1 to 3.
Figure 4B:
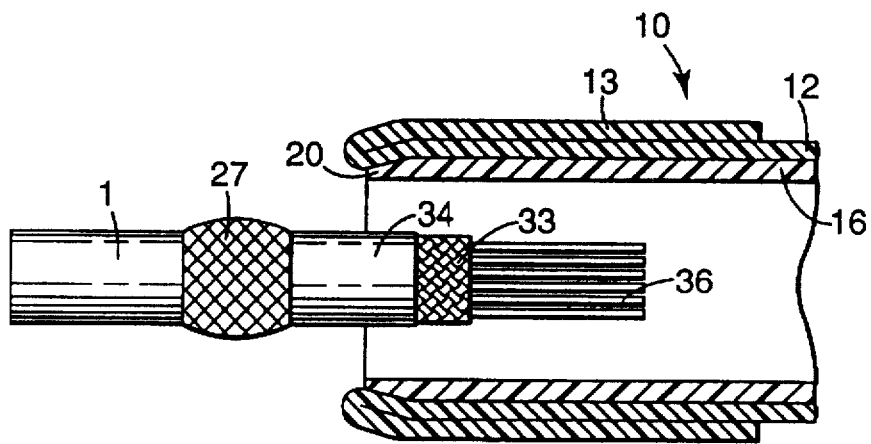
Figure 4C:
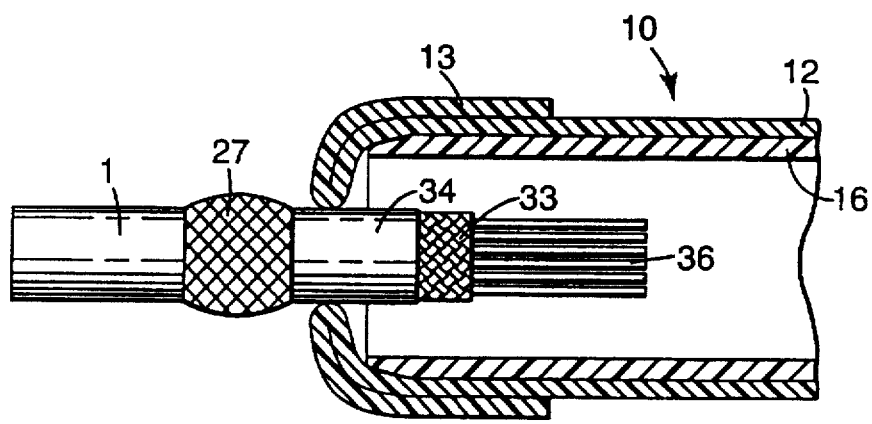
Figure 4D:
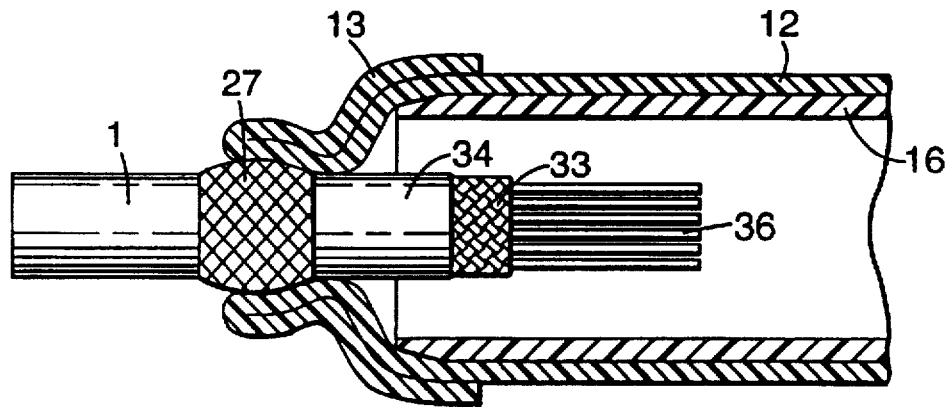
Figure 4E:
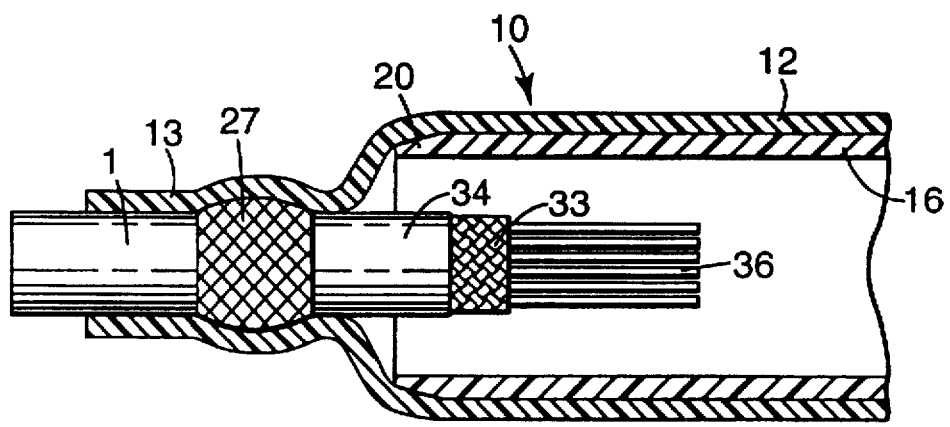

To install the cover, the outer sleeve portions 13 and 14 are moved longitudinally away from the center of the device 10 by sliding the outer portions 13, 14 on the underlying elastic sleeve 12 until the outer sleeve portions 13 and 14 have completely left the support 16 and conform to the elongate object 1 as shown best in the series of drawings FIG. 4A to D. These drawings show the installation of covering device 10 according to the present invention on cables 1. The cable 1 may include one or more insulated conductors 36, a screen 33, and an outer jacket 34. Cables 1 may be formed into a cable joint (not shown) in which the conductors 36 and the screen 33 are jointed by conventional means. The ends 13, 14 of elastic sleeve 12 are moved away from the center of device 10 progressively until outer portion 13 (or 14) conforms to the outer jacket 34 of cable 1. As the outer portion 13 becomes smaller in diameter its length increases, thus covering more of the cable jacket 34 than the length required on support 16 to accommodate the expanded outer portion 13 (or 14). This increase in length is typically 10 to 15% depending upon the expansion ratio of the elastic sleeve 12 and the diameter of the cable 1. The increase of length of outer portions 13, 14 on installation provides the advantage that a more compact device 10 can be constructed for a particular application. The end of the installed device 10 may appear as shown in FIG. 4E. In the installed condition, the highly expanded sleeve 12 on the support 16 conforms closely to the end portions 18 and 19 and the stress relieving means 20, 22 of support 16. The stress relieving means 20, 22 reduce the stress in the elastic sleeve 12 in the transition region between the central parallel portion of the support 16 and the smaller diameter of the elongate object 1. It has been found by experiment that without the stress relieving means 20, 22, the elastic sleeve 12 may split or tear at the positions immediately adjacent the ends of the support 16, either immediately after installation or after load cycling. The elastic sleeve 12 recovers onto the sealant 27, 28 and compresses the sealant against the object 1 to provide a water tight and/or environmental seal.

Figure 5A:
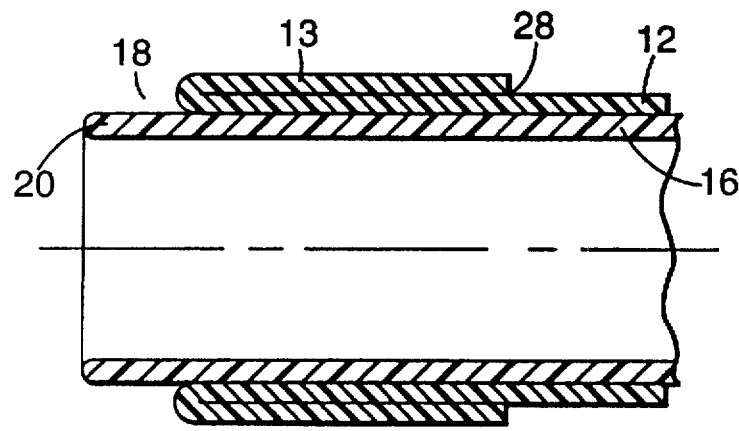
FIGS. 5A and 5B show cross-sections through end portions of an elastic sleeve of the covering device in accordance with the first embodiment of the present invention.

In accordance with the present invention means for substantially reducing the friction may be provided, such as lubrication or sliding means between the outer portions 13, 14 and the underlying portion of the elastic sleeve 12. It is generally not possible to slide the outer portions 13, 14 over the inner portion of the elastic sleeve 12 without some form of friction reducing means 30 as the compressive forces between the layers are high in the expanded state. The outer sleeve portions 13, 14 may be moved longitudinally over the underlying portion of the elastic sleeve 12 by inserting a probe (not shown) into the interface 28 (see FIG. 5A) between the outer sleeve portions 13, 14 and the underlying sleeve and blowing compressed air through the probe. This provides a means for reducing the friction between the outer portions 13, 14 and the underlying portion of the elastic sleeve 12 in the form of an air cushion between the outer sleeve portions 13, 14 and the underlying elastic sleeve portion 12.

Figure 5B:
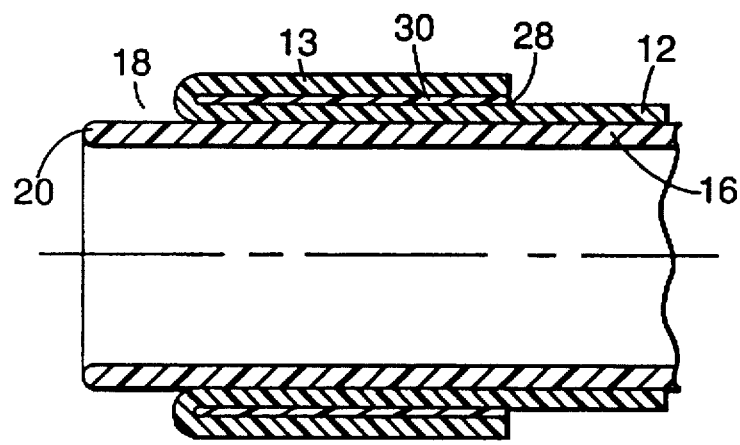

It is preferred if the means for reducing the friction are lubricating means 30 such as a lubricant 30 provided between the outer sleeve portion 13 or 14 and the underlying portion of the elastic sleeve 12 in the interface 28 as shown in FIG. 5B. The lubricating means 30 should be stable over long periods of time at normal storage temperatures and remain lubricating without degrading the adjacent elastic sleeve portions nor itself being degraded by them. The lubricating means 30 may be provided by a special surface preparation of the elastic sleeve 12 or may be an inherent property of this sleeve 12. Where a lubricant is used, it is preferable if it has as its basis materials which are inert with respect to, or incompatible with, the materials used for the elastic sleeve 12 in order to avoid intermixing or cross-diffusion of materials or components thereof.

Suitable materials for the lubricating means 30 may be as follows which is a non-exhaustive list: thixotropic oils including silicone oil; synthetic lubricants; vegetable oils and lubricants made therefrom; mineral oils and lubricants made therefrom; foils having a low coefficient of friction, lubricating pastes and gels; ball-bearings, microbeads or microspheres; graphite or graphite powder.

Further, the lubricating means 30 may include solid materials, for instance, microspheres of the kind described in "Scotchlite™ Glass bubbles hollow micro glass spheres" information booklet supplied by Minnesota Mining and Manufacturing Company (3M), St. Paul, Minn. from Jan. 1, 1995, may be mixed with any of the above mentioned lubricating materials. Alternatively, the lubricating means 30 may include graphite or be provided by a low friction, e.g. Teflon™, layer on the outer surface of elastic sleeve 12. Further, the lubricating means may be provided by a separate low friction tape or tapes, e.g. two layers of paper treated or coated to reduce friction, for instance, with particles, or a body plac ed in the interface 28, which is/are removed after installation.

Figure 6:
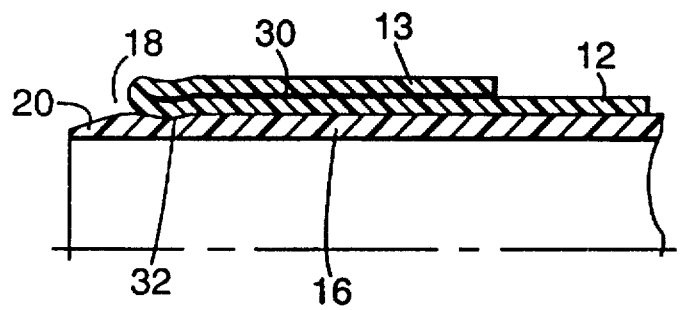
FIG. 6 shows a modification to the covering device according to the first embodiment of the present invention.

When lubricating means 30 is provided there may be a tendency for an outer portion 13 or 14 to slide off the underlying portion of the elastic sleeve 12 before the final installation. In order to prevent this, a groove 32 may be provided in the support 16 close to the position where the "fold" of the elastic sleeve 12 would lie, as shown in FIG. 6. Alternative fixing means such as a detachable raised lip or detachable clamp at the appropriate position (not shown) may be readily appreciated by a skilled person.

Figure 7A:
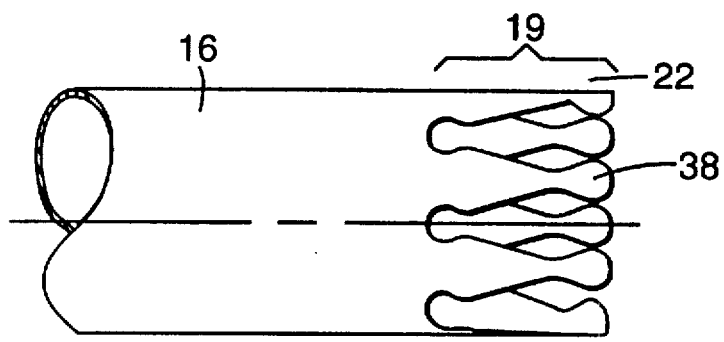
FIGS. 7A and B show a covering device in accordance with a second embodiment of the present invention.

FIG. 7A shows a second embodiment of the present invention in which the stress relief means 20, 22 are provided by a plurality of fingers 38 located in the portions 18, 19 of the support 16. The stress relief means 20, 22 have the same function as in the first embodiment. The same materials may be us ed in the second embodiment as specified for the first embodiment including the highly stretched elastic sleeve 12 and support 16. When the outer portions 13, 14 of the elastic sleeve 12 are slid forwards over the fingers 38, the hoop stress in the highly stretched elastic sleeve 12 bends down the fingers 38 to form a smooth transition between the central, parallel portion of the support 16 and the recovered elastic sleeve 12 on the elongate object 1. The fingers 38 may be integrally molded with support 16 e.g. by injection molding or may be cut or stamped out of the end portions 18, 19 or may be provided by a separate material adhered to the end of the support 16 to provide a similar form such as self-adhesive aluminium foil.

Figure 8A:
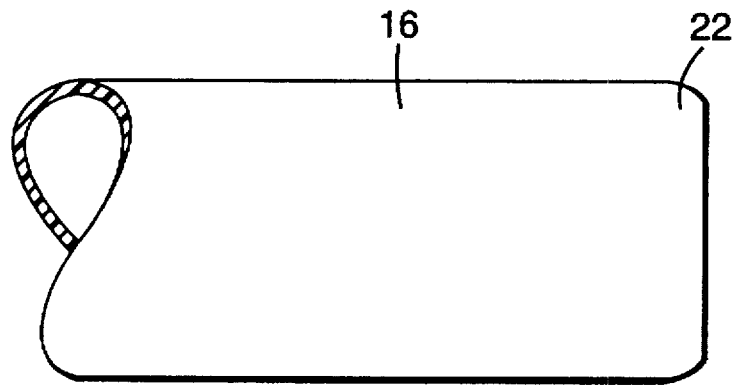
FIGS. 8A and B show a covering device in accordance with a third embodiment of the present invention.
Figure 8B:
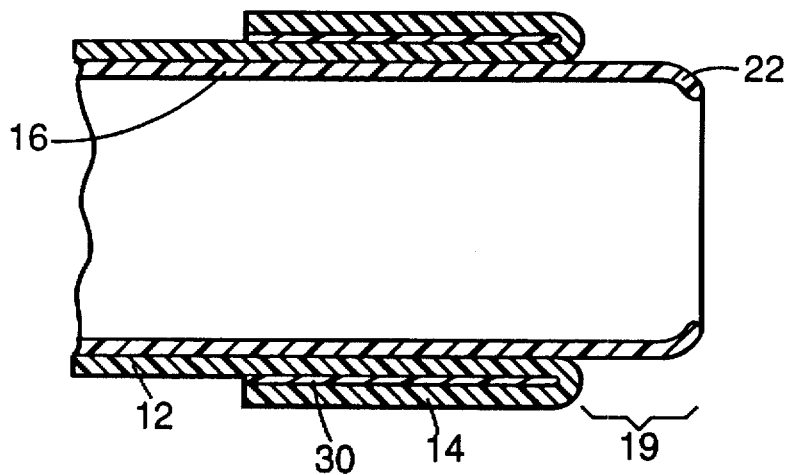
Figure 9A:
FIGS. 9A and B show a covering device in accordance with a fourth embodiment of the present invention.

FIG. 8A shows one end of a device 10 in accordance with a third embodiment of the present invention in which the stress relief means 20, 22 are provided by forming a rounded region 20, 22 located on the end portions 18, 19 of the support 16. The stress relief means 20, 22 have the same function as in the first and second embodiments. The same materials may be used in the third embodiment as specified for the first and second embodiments including the highly stretched elastic sleeve 12 and support 16. The rounded region 20, 22 may be formed in the wall of the support 16 by molding or by thermo-forming the end of a thermoplastic tube. As shown in cross-section in FIG. 8B the folded elastic sleeve 12, 13, 14 is mounted on the support 16 leaving the end portions 18, 19 free. The installation of device 10 in accordance with the third embodiment is similar to that described with respect to the first embodiment FIG. 9A shows a device 10 in accordance with a fourth embodiment of the present invention in which the stress relief means 20, 22 are provided by a plurality of flexible slats 35 which are located on the outside of the support 16 and which extend beyond the support 16. It should be understood that support 16 in FIG. 9A is generally tubular or cylindrical. The same materials are used in the fourth embodiment as used for the first to third embodiments. The slats 35 may be made from any suitable flexible material such as various plastics including polyolefins, polyethylene, polypropylene, etc. or metal such as aluminium if support 16 is also conductive. The slats 35 may have a pre-applied adhesive to the sides adjacent to the support 16 so that they remain in place during assembly of the elastic sleeve 12, 13, 14 onto the combined support 16 and slats 35. Alternatively, the support 16 may have equally spaced ribs on its outer surface (not shown) and the slats 35 may be located in the valleys between the ribs.

Figure 9B:
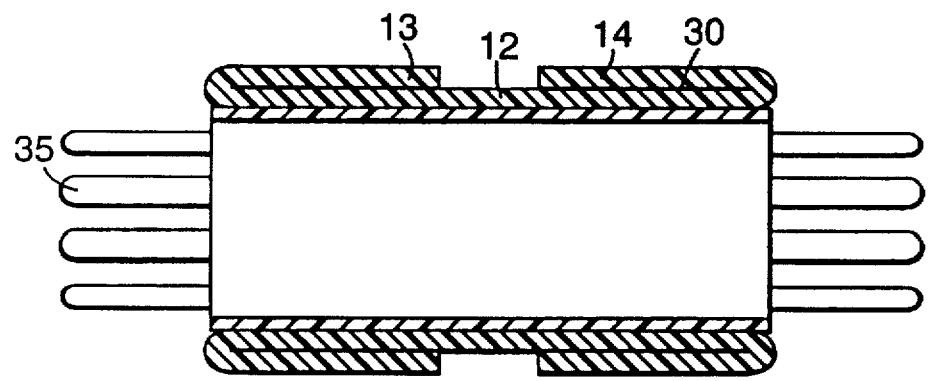

As shown in FIG. 9B schematically in cross-section, the folded sleeve 12, 13, 14 is applied to the combined structure of the support 16 and the slats 35. When the outer portions 13, 14 of the highly stretched elastic sleeve 12 are moved over the ends of the support 16 the hoop stress in the expanded elastic sleeve 12 bends the slats 35 towards the elongate object to provide a smooth transition from the support 16 to the elongate object 1. A lubricating means 30 may be provided between the outer portions 13, 14 and the sleeve 12 as for the first or second embodiments.

Figure 10:
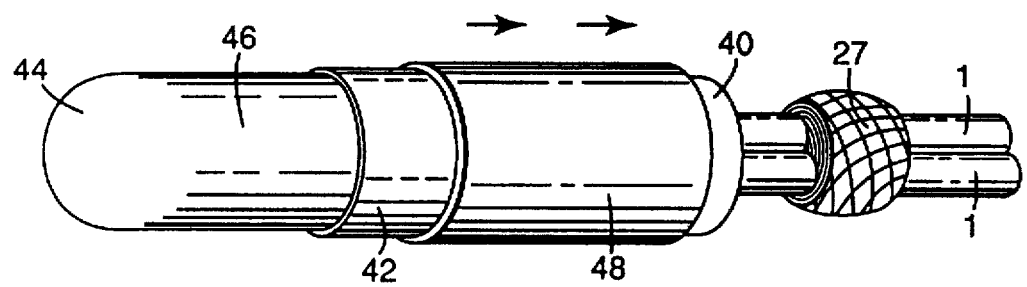
FIG. 10 shows a further covering device in accordance with a fifth embodiment of the present invention suitable for use as a cable end cap or as a dome closure.

In accordance with a fifth embodiment of the present invention, the support 16 need not be a tube but may also be a hollow body 46 closed at one end as shown in FIG. 10. The radially highly stretched elastic sleeve 42 is only provided with a single overlapping outer portion 48. Any of the stress relieving means 20, 22 of the first to fourth embodiments may be used for the stress relieving means 40 of support 46 adjacent the fold of outer portion 48 and sleeve 42, whereby with respect to the fourth embodiment the slats 35 need not extend completely along the hollow body 46 but may terminate under a portion of the elastic sleeve 42 adjacent to the support 46. Any of the lubricating means 30 of the first to fourth embodiments may be used with this arrangement. The end 44 of the support 46 may be closed or sealed to prevent moisture ingress or leakage of material from the elongate object 1 and may be used to form an end cap for a cable 1 or a dome closure for several cables 1.

Figure 11:
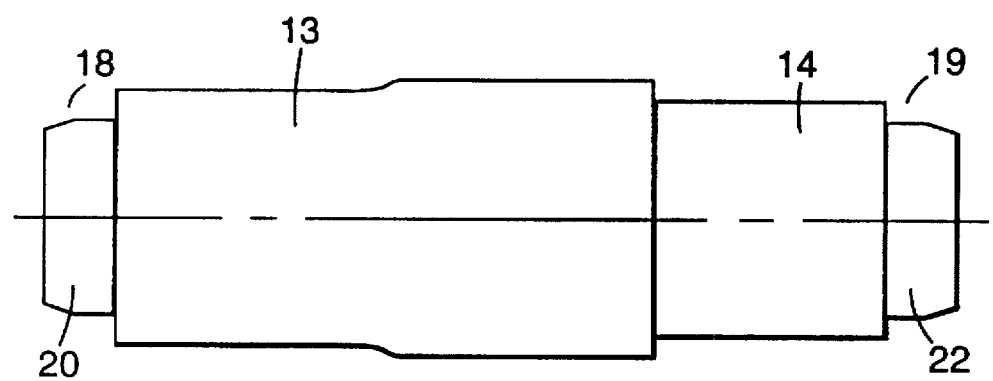
FIG. 11 shows a further covering device in accordance with a sixth embodiment of the present invention.

In accordance with a sixth embodiment of the present invention, one of the outer portions 13, 14 of the first to third embodiments may overlap the other one of the outer portions 13, 14 of the elastic sleeve 12 as shown schematically in FIG. 11. In the particular design shown the outer portion 13 must be installed first before the outer portion 14 by moving outer portion 13 longitudinally towards support end 18. The overlap of the outer portions 13, 14 provides the advantage of a very compact design. The sixth embodiment may be applied to any of the embodiments which have two outer portions 13, 14 of the sleeve 12.

FIGS. 12 to 19 show schematic representations of seventh to tenth embodiments of the present invention. The seventh to tenth embodiments will be described with respect to a hollow support 16 but the invention is not limited thereto.

Figure 7B:
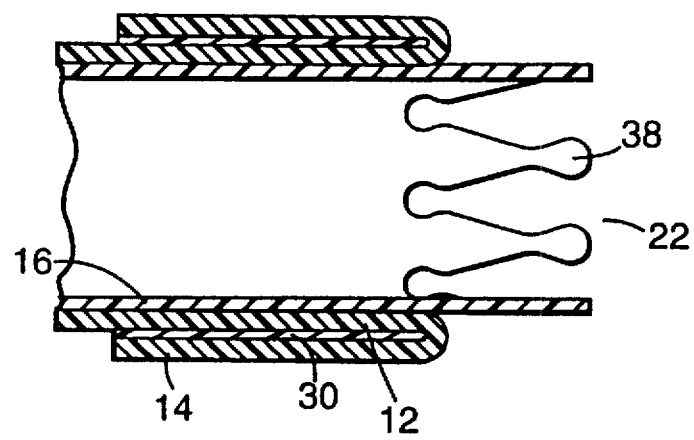
Figure 12:
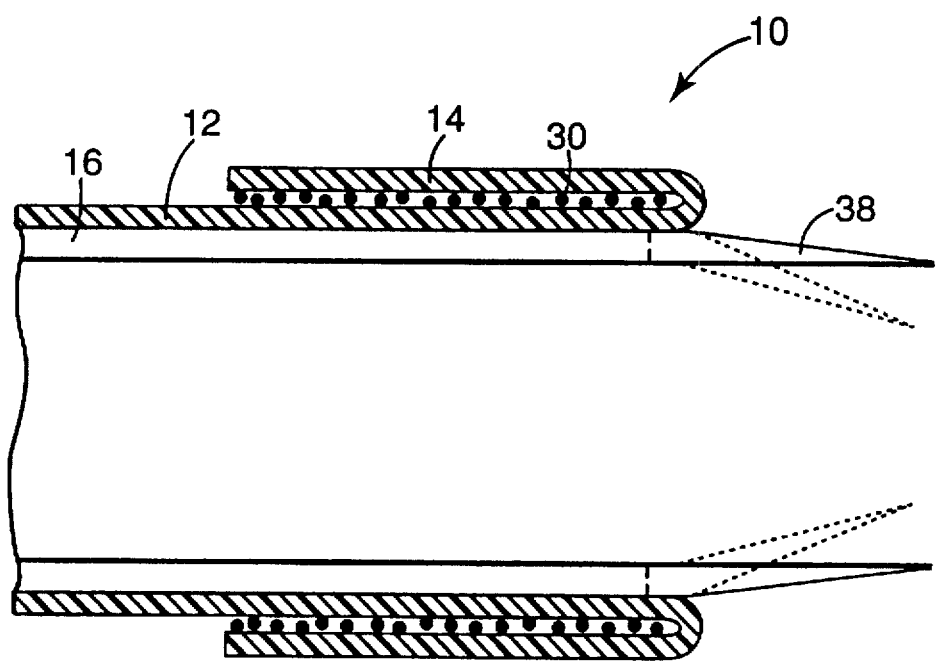
FIG. 12 shows schematically a further covering device in accordance with a seventh embodiment of the present invention.

FIG. 12 shows a schematic cross-section of a seventh embodiment in accordance with the present invention which is a modification of the embodiment as shown in and described with respect to FIG. 7A and 7B. The same materials may be used in the seventh embodiment as have been described with respect to the first to sixth embodiment. As shown in FIG. 12, the folded-back portion 14 of the sleeve 12 is located adjacent at least one of the ends of the support core 16. The fingers 38 (which have been described with respect to the embodiment shown in FIG. 7A and 7B) are tapered in thickness in accordance with the seventh embodiment such that the thickness of the fingers 38 reduces the closer to the end of the support core 16. The advantage of the arrangement in accordance with the seventh embodiment is that the fingers 38, when they are tapered, adapt themselves more readily to a form which reduces gradually in diameter from the diameter of the central part of the support core 16 to the diameter of the elongated object 1 to which the sleeve 12 is to be applied. In order to avoid the tapered fingers 38 having a sharp end, it is preferred that the ends of the fingers 38 are provided with a radius as described with respect to FIG. 2B.

FIGS. 13A, 13B, 14A, 14B show schematically a covering device 10 in accordance with an eighth embodiment of the present invention. The materials described with respect to the first to seventh embodiments may be used with the eighth embodiment. The eighth embodiment is a modification of the covering device 10 described with respect to FIGS. 7A and 7B. Further, the support core 16 includes fingers 38 at its end which may be tapered in accordance with the seventh embodiment (not shown). In accordance with the eighth embodiment the folded-back end of the elastic sleeve 12 may either be located at the beginning of the fingers 38 as described with respect to FIGS. 7B and 12, but it is preferred if the folded-back end is located very closely to the end of the fingers 38 as shown in FIGS. 13A and 14A. In order to prevent fingers 38 from collapsing prematurely under the radial force provided by the pre-expanded elastic sleeve 12, a support device 50 is located under at least the ends of the fingers 38. The support 50 may be a circular or polygonal tube 54 as best shown in FIG. 14B or may include a circular or polygonal core 53 with protrusions 51 extending radially outwards from the circular or polygonal core 53 to form gaps 52 as best shown in FIG. 13B. The number of gaps 52 may be chosen to be equal to the number of fingers 38 associated with the support core 16. The fingers 38 of support core 16 may be located in gaps 52 when the support device 50 is installed under fingers 38. It is preferred in the eighth embodiment if some form of lubricating means 30 is provided between the folded-over end 14 and sleeve 12.

To install the device 10 in accordance with the eighth embodiment, device 10 is slid over the elongate object to which the sleeve 12 is to be applied. Then, the temporary support 50 is removed by pulling it out from beneath the fingers 38 or by crushing the temporary support 50 if this is made of a frangible material. The radial force on the fingers 38 generated by the pre-stretched elastic sleeve 12 then cause the fingers 38 to collapse towards the elongate object. Once this process has started, the folded sleeve 14 may slide automatically onto the elongate object in a continuous procedure described in principle with respect to FIGS. 4B to 4E. If the folded-over end 14 of elastic sleeve 12 does not install itself automatically, the jointer may assist the installation by exerting a longitudinal force in the direction away from the center of support core 16 in order to slide the folded-over portion 14 with respect to the central portion of elastic sleeve 12.

The tabs 51 of the temporary support 50 as shown in FIG. 13B may be located adjacent the ends of fingers 38 as shown in FIG. 13A in order to act as a stop for the folded-over portion 14 of sleeve 12 and to prevent premature installation of the elastic sleeve 12. The temporary support 50 may be provided with a pull tab (not shown) for ease of removal from under the fingers 38.

Figure 15:
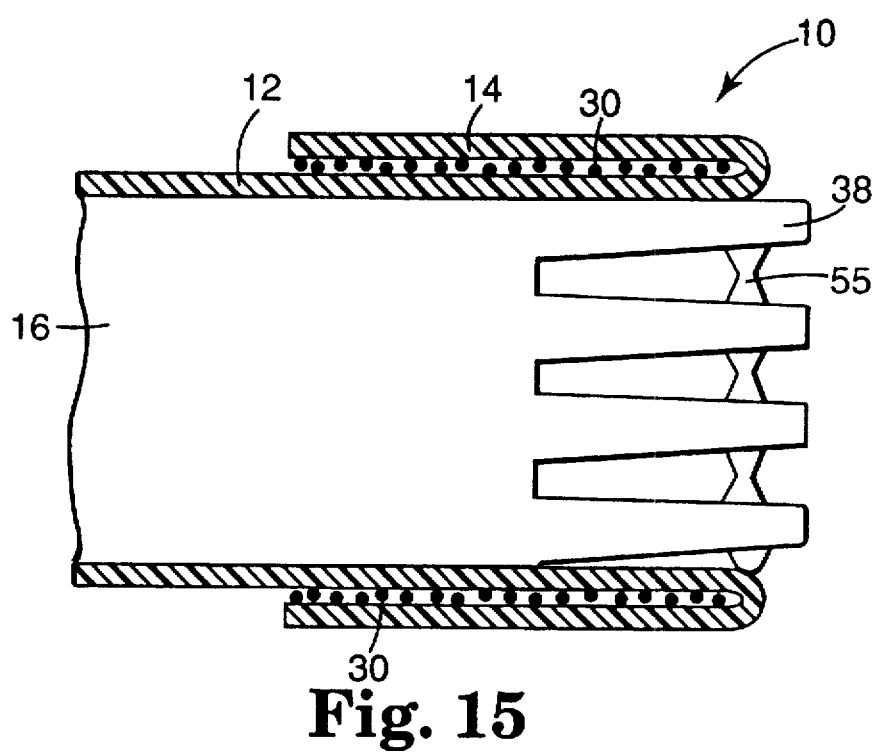
FIGS. 15 to 17 show schematic representations of a ninth embodiment of the present invention.
Figure 16:
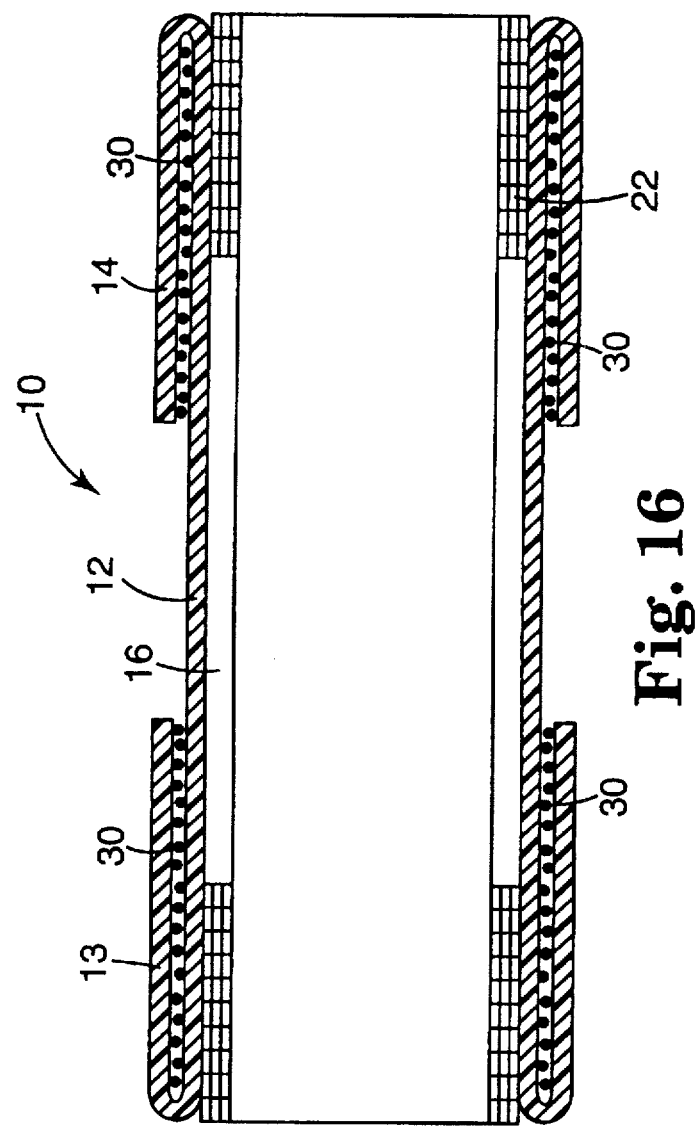
Figure 17:
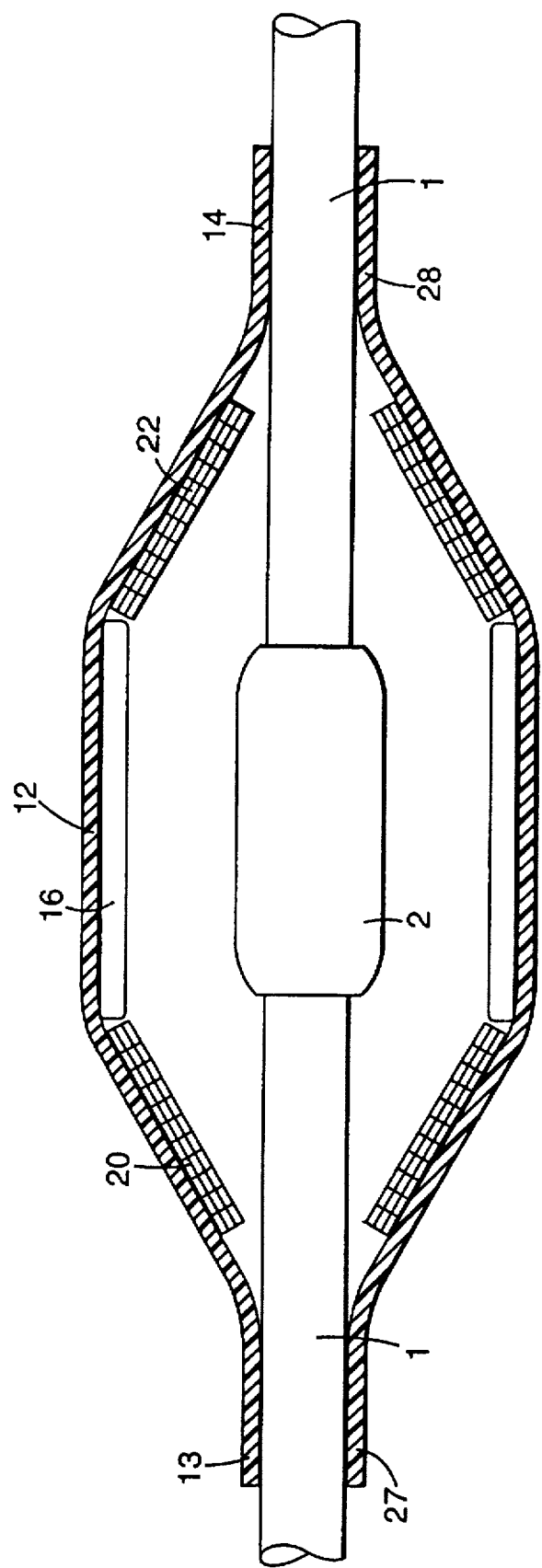

FIGS. 15 to 17 show schematic cross-section drawings of a ninth embodiment of the present invention. The material described with respect to the first to eighth embodiments may be used with the ninth embodiment.

In accordance with the ninth embodiment, as shown in FIG. 15, frangible support portions 55 are provided between the fingers 38 which have been previously described with reference to drawings 7A, 7B, 13A, 13B, 14A and 14B. As with the eighth embodiment, the fold of the folded-over portion 14 of the elastic sleeve 12 may be located adjacent to the end of the fingers 38, this fold being supported by fingers 38 which are held in place by the intermediate support portions 55 between the fingers 38 preventing collapse thereof. Frangible intermediate portion 55 may be made from materials described in EP-0530952 or the co-pending European Patent Application with the application number 95201679.8, a copy of both of which are incorporated herein by reference. In particular frangible intermediate support portions 55 may be produced by dipping the ends of fingers 38 into a curable resin solution of sufficient viscosity that, on removing fingers 38, sufficient resin material remains between the fingers 38. The resin material used for intermediate support members 55 may be a resin selected from the general classes of polystyrenes, polyesters, epoxies and polyacrylates. Preferred brittle resin components include rapid cure (4 to 5 min.) epoxy resins; amine-cured, 2-part epoxies; transparent styrene polyester resins and solvent soluable acrylate resins. These resins may be filled with a variety of particulate matter in order to increase their brittleness, for instance fibers, flakes, microspheres.

Intermediate support members 55 may be integral with the support core 16 and manufactured therewith. For instance, support core 16, fingers 38 and intermediate support members 55 may be manufactured in accordance with the materials and methods described in co-pending European Patent Application with the application number 95201679.8. Thus, for instance, support core 16 may be made by injection molding of a liquid crystal polymer, for instance of the type Vectra™, manufactured by Hoechst AG, Frankfurt a/M, Germany and in particular type B130 or polymethylmethacrylate such as Leucryl™, made by the company BASF, Germany, in particular type G55; or polystyrene made by the company BASF, Germany, in particular type 144C or mixtures of polystyrene and PMMA.

A modification of the ninth embodiment is shown schematically in FIG. 10. In this embodiment frangible portions 20, 22 are formed at least at one end of the support core 16 similar in structure and produceable by the techniques described in co-pending European Patent Application with the application number 95201679.8. Thus, frangible zones 20, 22 are formed at the ends of support core 16, these ends 20, 22 including longitudinal members which are joined to their neighbours by means of frangible cross-members to form a crushable lattice- or net-structure.

The devices 10 in accordance with the ninth embodiment are installed by slipping device 10 over the elongated object to be covered and then crushing ends 20, 22, alternatively the intermediate support members 55 by hand and allowing end portions 13, 14 to slide off elastic sleeve 12 onto the elongated object to be covered. The final installation is then as shown schematically in FIG. 17 for two cables 1 and a connector 2 for connecting the electrical conductors of cables 1. The crushed longitudinal members alternatively fingers 38 form a tapered as installed stress relief zones.

Figure 18:
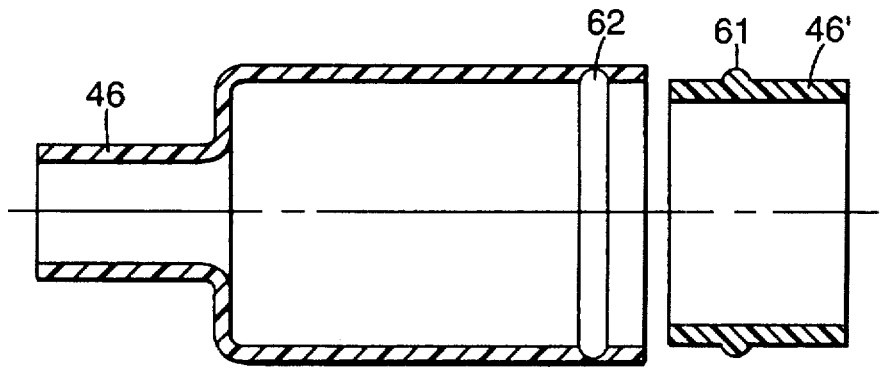
FIGS. 18 and 19A, B, C and D show schematic representations of a tenth embodiment of the present invention.

FIGS. 18 and 19 show a modification of the previous embodiments of the present invention. Although this modification will be described with respect to a hollow support core 16, the principle is also applicable to a solid support core 16.

A cover device 10 in accordance with a tenth embodiment of the present invention will be described with respect to FIG. 18. The tenth embodiment may provide the advantage of requiring less room for jointing. The cover device 10 may include a support core which includes two interlocking portions. These may include cylindrical cores 46, 46', made using the same materials as specified for the first to ninth embodiments, as well as two radially expanded elastomeric sleeves 16, respectively (not shown). One elastic sleeve 12 is installed on and held in a radially expanded state by means of the cylindrical core 46, and one by means of cylindrical core 46'. If necessary, elastic sleeves 16 may be sealed to the solid tubular portions 46, 46', respectively, by means of suitable adhesive. The folded elastic sleeves 12 are located on the ends of cylindrical core 46, 46' respectively, which are remote from a quick-fit connection 61, 62.

Core 46 may be mechanically interconnected with core 46' by means of the quick-fit connection. For example, the core 46 may be provided with a circumferential groove 62 which may have a semi-circular cross-section or similar adjacent the end of core 46. The core 46' has a circumferential protuberance 61 which has a cross-section designed to fit into the circumferential recess 62 of core 46. The diameters of cores 46 and 46' and the height of protuberance 61 and the depth of recess 62 are chosen so that core 46' slides within core 46 with sufficient interference between the outside diameter of the protuberance 61 and the inner diameter of the core 46 so that protuberance 61 locates in recess 62 in the final position to form a water-tight seal.

The cover device 10 in accordance with the tenth embodiment is installed in the following way. The separate cylindrical parts 46, 46' are pushed over the left and right parts, respectively, of the cables to be jointed. After jointing the cables, the cores 46, 46' are brought together and interconnected. Subsequently, folded portions 13, 14 of elastic sleeve 12 are installed onto their respective parts of the cables as has been described with reference to the previous embodiments.

FIG. 19 shows various modifications of the quick-fit connection described with respect to the tenth embodiment. These will be described with reference to the ninth embodiment. As shown in FIG. 19A, the circumferential protuberance 61 and the circumferential recess 62 of the ninth embodiment may have a triangular cross-section. FIG. 19B shows a modification of the cover device 10 of FIG. 19A whereby the protuberance 62 is located on the inside of tubular portion 46 and recess 61 is located on the outer surface of tubular portion 46'. As shown in FIG. 19C, the end of tubular portion 46 of part 42 may be provided with a step for location of an O-ring 63. The O-ring 63 may be any conventional O-ring. The distance between protuberance 61 and the end surface of tubular portion 46' is chosen so that when protuberance 61 is located in recess 62 of part 46, the O-ring 63 is compressed between the step of part 46 and end surface of part 46'. The O-ring 63 may provide a water and moisture seal while protuberance 61 and recess 62 may provide mechanical locking.

Figure 19A:
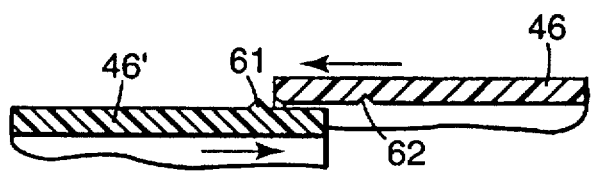
Figure 19B:
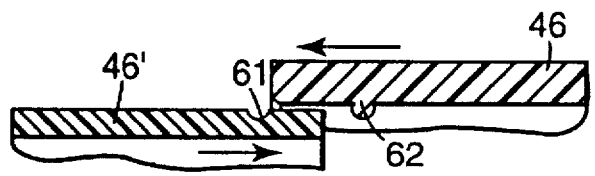
Figure 19C:
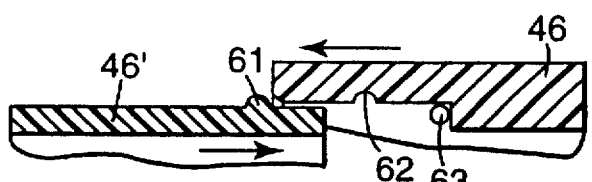
Figure 19D:
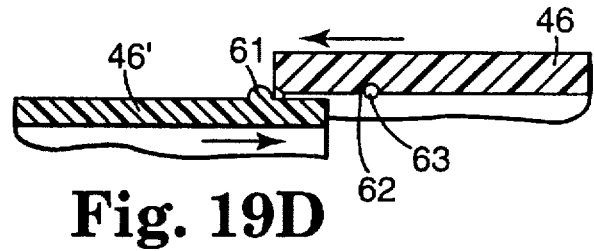

FIG. 19D shows a further modification of the cover device 10 shown in FIG. 19C. The O-ring 63 is located in the circumferential recess 62 of part 46. When protuberance 61 of part 46' locates in groove 62 of part 46, O-ring 63 is automatically placed under compression.

In all the embodiments the support 16 also provides mechanical protection to the covered elongate object 1 and moisture tightness may be provided by the use of sealant 27, 28 in combination with the elastic sleeve 12.

In embodiments 1 to 10 the elastic sleeve 12 or the folded elastic sleeve 12, 13, 14 may be mounted on the support 16 using conventional techniques as described, for instance, in U.S. Pat. No. 4,506,430; U.S. Pat. No. 5,098,752; or U.S. Pat. No. 2,803,056.

Stress relieving means 20, 22 of embodiments 1, 2, 7 and 9 are preferred as they neither increase the outer diameter nor decrease the inner diameter of the support 16.

EXAMPLE

A covering device 10 in accordance with the invention was manufactured by applying an EPDM track resistant elastic sleeve 12 having a diameter of 10.6 mm and a thickness 3 mm in the relaxed state, was applied to a support 16 having a diameter of 32 mm and a thickness of 1.8 mm made from polypropylene phosphonitrilic plastic material. The elastic sleeve 12 was folded back on itself to form outer portions 13, 14 of 75 mm length in the recovered state and 55 mm in the expanded state. The stress relieving means 20, 22 were provided by a taper of 8.1 degrees down to a support wall thickness of 1 mm followed by a rounded tip with a radius of 0.5 mm. The covering device 10 was then applied to a bifurcating cable joint formed from a single cable of 12 mm diameter on one side of the joint and 2 cables of 11 mm on the other side of the joint as shown schematically in Fig. 3. The sealant 27, 28 was provided by a mastic tape number 2229 or 5313 obtainable from Minnesota Mining and Manufacturing Company (3M), St. Paul, Minn., USA. The cable splice was tested according to the freeze thaw test of item 5.3.6 of the "Generic requirements for service wire splice for buried service" of Bellcore , Bell Communications Research, technical reference TR-NWT-00251 issued 2, May, 1991. The covered cable joint was subjected to 50 cycles between −40° and 70° C. under 30 cm of sand saturated with water. In each cycle the sample was maintained for ten hours, at the extreme temperatures and four hours between the extremes in an environmental chamber. No cracking of the elastic sleeve 12 was observed. The cable joint passed the electrical test required after load cycling.

We claim:

1. A covering device for applying an elastic cover to an elongate object comprising:

a folded elastic sleeve having an inner sleeve portion and at least one coaxially disposed outer sleeve portion overlaying said inner sleeve portion, said inner and outer sleeve portions being continuously joined at least at one circumferential edge;

a support for holding said folded elastic sleeve in a radially stretched condition, said support having a first end arranged adjacent to the continuously joined circumferential edge of said outer and inner sleeve portions, relative movement between said outer sleeve portion and said inner sleeve portion resulting in said outer sleeve portion moving and recovering onto the elongate object; and said support further including stress relief means associated with said first end for reducing the stress in said outer sleeve portion adjacent to said first end of said support when said outer sleeve portion has been moved onto the object to be covered.

2. A covering device in accordance with claim 1, further comprising means for substantially reducing friction between the outer and inner sleeve portions.

3. A covering according to claim 2, wherein said means for reducing friction are provided by lubricating means.

4. A covering device according to claim 1, wherein at least in an installed condition, said stress relief means include said first end being tapered and reduced in diameter with increasing distance from the center of said support.

5. A covering device according to claim 1, wherein said stress relief means include a plurality of flexible fingers forming said first end.

6. A covering device in accordance with claim 1, wherein said elastic sleeve on said support is expanded with an expansion ratio of at least 3 to 1.

7. A covering device according to claim 5, wherein said support includes means, adjacent said first end, for temporarily supporting said elastic sleeve, removal or collapse of said temporary support means generating the relative movement between said outer sleeve portion, and said inner sleeve portion to recover said elastic sleeve onto the elongate object.

8. A covering device according to claim 7, wherein said temporary support means is a removable cylindrical member located adjacent to and supporting ends of said plurality of flexible fingers.

* * * * *